(12) United States Patent
Saily et al.

(10) Patent No.: US 7,778,615 B2
(45) Date of Patent: Aug. 17, 2010

(54) SIGNAL LEVEL ESTIMATION IN RADIO COMMUNICATION SYSTEM

(75) Inventors: Mikko Saily, Sipoo (FI); Olli Piirainen, Oulu (FI); Kari Niemela, Oulu (FI); Jari Hulkkonen, Oulu (FI)

(73) Assignee: Nokia Corporation, Espoo (FI)

( * ) Notice: Subject to any disclaimer, the term of this patent is extended or adjusted under 35 U.S.C. 154(b) by 650 days.

(21) Appl. No.: 11/723,510

(22) Filed: Mar. 20, 2007

(65) Prior Publication Data

US 2008/0003965 A1  Jan. 3, 2008

(30) Foreign Application Priority Data

Jun. 29, 2006 (EP) .................................. 06116310

(51) Int. Cl.
   *H04B 17/00* (2006.01)
(52) U.S. Cl. .................. 455/226.2; 455/132; 455/272
(58) Field of Classification Search ......... 455/132–134, 455/137, 226.1, 226.2, 272, 273, 277.2; 375/347
   See application file for complete search history.

(56) References Cited

U.S. PATENT DOCUMENTS

| 6,418,175 | B1 * | 7/2002 | Pukkila et al. ............. 375/347 |
| 6,445,757 | B1 * | 9/2002 | Raitola et al. ............. 375/347 |
| 2007/0025434 | A1 * | 2/2007 | Sternberg et al. .......... 375/229 |

FOREIGN PATENT DOCUMENTS

| DE | 196 44 965 A1 | 4/1998 |
| EP | 0 430 481 A2 | 6/1991 |
| WO | WO 98/16079 | 4/1998 |

OTHER PUBLICATIONS

International Search Report for International Application No. PCT/IB2007/051116 filed Mar. 29, 2007.
3GPP TS 03.64 V8.7.0 (Jan. 2001), $3^{rd}$ Generation Partnership Project; Technical Specification Group GERAN; Digital cellular telecommunications system (Phase 2+); General Packet Radio Service (GPRS); Overall description of the GPRS radio interface; Stage 2 (release 1999); Global System for Mobile Communications, pp. 1-58.
3GPP TS 05.08 V8.22.0 (Nov. 2004); $3^{rd}$ Generation Partnership Project; Technical Specification Group GSM/EDGE Radio Access Network; Radio subsystem link control (release 1999); Global System for Mobile Communications; pp. 1-100.
GSM 11.10-1 version 9.0.7 Release 2000; Draft ETSI EN 300 607-1 V9.0.1 (Jul. 2000), Chapter 21, pp. 461-475.
3GPP TS 11.21 V8.10.0 (Nov. 2005); $3^{rd}$ Generation Partnership Project; Technical Specification Group GSM/EDGE Radio Access Network; Base Station System (BSS) equipment specification; Radio aspects (release 1999); Global System for Mobile Communications; pp. 1-159.

* cited by examiner

*Primary Examiner*—Nguyen Vo
(74) *Attorney, Agent, or Firm*—Squire, Sanders & Dempsey, LLP

(57) ABSTRACT

An indicator of a strength of a signal comprising a training sequence portion received in a radio propagation environment is provided. Samples are taken from the training sequence portion, an energy value of the samples over an estimated channel impulse response is computed and the indicator of the strength of the signal is estimated from the energy value.

21 Claims, 5 Drawing Sheets

NB =

| GUARD | TAILS | DATA | TRS | DATA | TAILS | GUARD |
|---|---|---|---|---|---|---|
| 4 | 3 | 58 | 26 | 58 | 3 | 4 |

AB =

| TAILS | TRS | DATA | TAILS | GUARD |
|---|---|---|---|---|
| 8 | 41 | 36 | 3 | 68 |

Fig. 4

SIGNAL LEVEL ESTIMATION IN RADIO COMMUNICATION SYSTEM

The present invention relates to providing an indicator of a strength of a signal received in a radio propagation environment.

RSSI (Received Signal Strength Indicator), SNR (Signal-to-Noise Ratio), SIR (Signal-to-Interference Ratio), BER (Bit Error Rate) and BEP (Bit Error Probability) are important link level measurements, which are used by Radio Resource Management (RRM) algorithms such as Handover, Power Control and Link Adaptation etc. in a radio communication system. The handover and power control features use parameters such as RX quality, RX_QUAL, and RX level, RX_LEV, as decision metrics. RSSI is used to obtain RX_LEV, whereas BER or BEP is used to obtain RX_QUAL.

For example, EDGE (Enhanced Data rates for Global Evolution) UltraSite employs received signal plus noise plus interference power (S+N+I) as a measurement of received radio link signal level. An adjacent channel interference is removed using a low pass filter but this filter cannot suppress co-channel interference and thermal noise. This approach has been derived for the noise limited systems, where the radio propagation environment is fairly predictable and required signal-to-noise ratio, SNR, is large. These conditions will no longer be true for interference limited systems, where the propagation environment is characteristically erratic even at high absolute signal levels, and therefore the radio receivers need to operate at a much lower signal-to-interference-plus noise-ratio, SINR.

Interference combining/cancelling receivers have been developed for systems, where the co- and adjacent channel interferences are the main limiting factors preventing higher system capacity and spectral efficiency. Therefore the estimation and reporting of true RSSI towards the network is important for Power Control (PC) and Handover (HO) algorithms.

In the following a problem of the conventional RSSI estimation is described.

HO algorithms considering Inter-Cell and Intra-Cell handovers can be described as follows:
1. Inter-Cell HO is triggered if quality is degraded and pathloss is high (<−95 dBm) or pathloss is very high (<−105 dBm).
2. Intra-Cell HO is triggered if quality is degraded and pathloss is moderate (>−85 dBm).

A problem regarding HO and PC has been identified, when the two following factors A) and B) in the network with current BTS (Base Transceiver Station) implementation are present:
A) Currently the RX level estimation algorithm calculates the RX level based on the total received power C+I+N (wanted/desired signal+interference+noise). With well performing ST-IRC (Space-Time Interference Rejection Combining) interference it could be up to 30 dB higher than wanted signal C resulting to 20 dB higher RX_LEV reporting than actual wanted signal RX level C is.
B) BSC HO algorithm triggers Intra-Cell HO instead of Inter-Cell HO when RX_LEV>−85 dBm and RX_QUAL<5.

By combining A) and B) a case results where actual RX level is actually close to −110 dBm, but reported RX_LEV is −80 dBm and Intra-Cell HO is triggered instead of needed Inter-Cell handover.

Indeed level based Power Control may be triggered when RX_LEV measurement is contaminated by interference.

It is important to note that a similar problem exists also in downlink RX_LEV measurements especially when MS (Mobile Station) diversity is used.

The reason for the above problem is the RX level estimation algorithm, which in the current implementation will also report part of an interfering signal power as a desired user received signal power. The current implementation also lacks a proper estimation of RX level with multiple diversity antennas.

According to the prior art, RSSI is calculated based on average energies of a received signal (normal signal and diversity signal). The average energy is converted into logarithmic scale. Due to 270 kHz wide-band FIR (Finite Impulse Response) filter used in the front end, additional filtering is required to compensate adjacent channel interference from 200 kHz carrier spacing. In this approach additional filter is needed, because the adjacent channel interference will increase RX level and cause inaccurate estimate. This filter is used only for RSSI measurement.

An RSSI measurement block diagram is shown in FIG. 1.

As shown in FIG. 1, received floating point samples $r_N, r_D$ (subscript N indicating a 'normal' signal, subscript D indicting a diversity signal) from receiver hardware are subjected to normalisation by normalisation blocks to result in normalised fixed point samples $r'_N, r'_D$. The normalised fixed point samples $r'_N, r'_D$ are subjected to RSSI filtering by RSSI Filters to result in normalised filtered samples $r''_N, r''_D$.

Energy values in different points of the diagram of FIG. 1 are calculated as follows:

$$E1_N = \frac{\sum_{k=\frac{p}{2}}^{\frac{p+M}{2}-1} |r_N(2k)|^2}{M/2} \quad E1_D = \frac{\sum_{k=\frac{p}{2}}^{\frac{p+M}{2}-1} |r_D(2k)|^2}{M/2} \quad (1), (2)$$

wherein $E1_N$, $E1_D$ denote energy of raw samples for normal and diversity signals, respectively, $$E2_N = \frac{\sum_{k=p}^{p+M-1} |r'_N(k)|^2}{M} \quad E2_D = \frac{\sum_{k=p}^{p+M-1} |r'_D(k)|^2}{M} \quad (3), (4)$$

wherein $E2_N$, $E2_D$ denote energy of normalised samples for normal and diversity signals, respectively, $$E3_N = \frac{\sum_{k=p}^{p+M-1} |r''_N(k)|^2}{M} \quad E3_D = \frac{\sum_{k=p}^{p+M-1} |r''_D(k)|^2}{M} \quad (5), (6)$$

wherein $E3_N, E3_D$ denote energy of normalised and filtered samples for normal and diversity signals, respectively.

The energy calculations above and the gain of the additional filter G for RSSI measurement (the gain of the filter is known a priori) are provided for RSSI computation. For each branch (Normal and Diversity), final RSSI values are computed according to:

$$RSSI_f = 10\log(E1) + 10\log\left(\frac{E3}{E2}\right) - G \quad (7)$$

The equation (7) above is used to compute the final RSSI of a signal branch.

In case of multiple antennas, the highest value is chosen and reported e.g. to an HO algorithm of a BTS or an MS.

This prior art approach will cause an estimation error of desired received signal power level in the presence of strong interfering signals. The true RX level and reported RX_LEV, based on the estimated RSSI, will show discrepancy due to additive co-channel interference signal power.

In other words, in interference limited scenario problems regarding HO and PC have been identified. Currently it is not specified that RX level report must contain only the desired signal power, therefore also the total received power (C+I+N) can be reported. This leads to severe a problem with well performing IRC (Interference Rejection Combining) receivers, because the interference could contain significantly higher power than wanted signal resulting in erroneous RX_LEV reporting. It is important to note that same problem exists also in downlink RX_LEV measurements when MS diversity is used.

SUMMARY OF THE INVENTION

The invention should solve the above problems and improve RSSI calculation.

According to the invention, an indicator of a strength of a signal comprising a training sequence portion received in a radio propagation environment is provided. Samples are taken from the training sequence portion, a channel impulse response is estimated, an energy value of the samples across the channel impulse response is computed and the indicator of the strength of the signal is estimated from the energy value.

In case further processing with noise whitening is required or preferred, when extracting the training sequence portion, interference may be removed from the signal.

In case a plurality of diversity signals are received, the extracting, sampling and computing steps are performed for each of the plurality of diversity signals, and plurality of computed energy values are combined, and the indicator is estimated from the plurality of combined energy values.

According to the invention, a diversity receiver with interference cancellation is able to operate in interference limited environment, where the Carrier/Interference ratio can be very low, or even negative. Prior art GSM/EDGE specifications do not support this, because the RX-Level estimation and reporting is conventionally not requested to operate supporting interference rejection receivers, which will operate on a C/I area previously not available.

Integral embodiments of the invention are:
reception of desired signal using a diversity receiver;
interference cancellation or noise whitening;
signal level estimation in the presence of interference; and
reporting true RX-Level.

The invention can be implemented in a base transceiver station and/or a mobile station, wherein the base transceiver station and the mobile station may be part of a communication network system.

The invention may also be implemented as computer program product. Moreover, the invention may be implemented in a semiconductor chip.

According to the invention, more accurate power control and handover processes can be achieved, which will improve the network capacity and link quality.

Reporting of true RX level reduces the number of dropped calls, and unnecessary Intra-Cell handovers.

According to the prior art RSSI calculation, calculation of received power over the whole burst (i.e. training sequence plus a predefined number of data symbols) is performed. According to the invention, there is no need to handle the whole burst anymore, which enables simpler and significantly less complex implementation, and therefore saves DSP (Digital Signal Processor) processing power. Processing only the TRS (TRaining Sequence) enables also more accurate RSSI estimate in the presence of one or more strong interferers.

In addition, the RSSI estimation of the present invention works well against interferers in an unsynchronized network.

The invention proposes a robust KPI (Key Parameter Indicator) estimation scenario, which can be used to improve the radio performance both in downlink and uplink.

The invention provides more than adequate information for BSC (Base Station Controller) HO decision algorithm in scenarios of diversity antennas with strong limited interference. It implies the improvement towards QoS and DCR (Delay-Constrained Routing) at network level performance.

The invention is preferably applicable to GSM/EDGE. Also, the invention is applicable to both handsets and BTS.

The present invention improves RSSI calculation. With the invention a true estimate of received signal power can be achieved even under strong co-channel and adjacent channel interference.

The prior art method estimates signal plus noise plus interference power as received signal power (i.e. the algorithm is placed before interference removal). Moreover, the prior art method calculates the power of the individual branches (in case of diversity) and reports the highest power as the final value.

According to the invention, interference can be removed in the individual branches and the power of those individual branches is calculated and then the combined power is output.

As mentioned above according to the invention it is possible to obtain true RSSI report even under strong interference even if there is negative C/I.

BRIEF DESCRIPTION OF THE DRAWINGS

FIG. 4 shows a burst format according to GSM/EDGE as an example implementation and the placement of a training sequence (TRS).

DESCRIPTION OF PREFERRED EMBODIMENTS

In the following the present invention will be described by way of preferred embodiments thereof.

Figure 1:
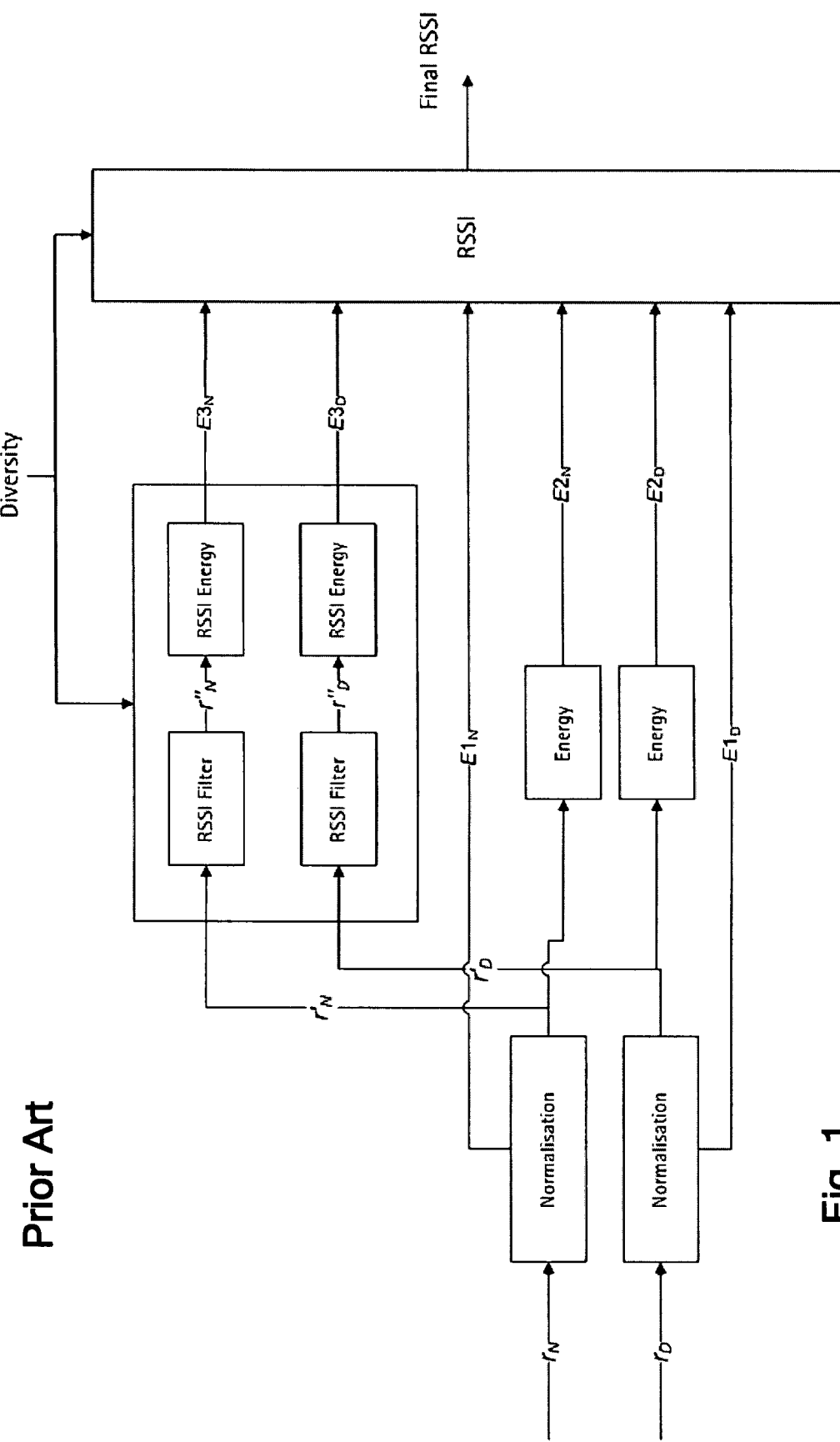
FIG. 1 shows a schematic block diagram illustrating an RSSI energy calculation according to the prior art.

According to the invention, a training sequence portion of a signal is used for estimating RSSI for power control and handovers. This enables a more accurate RSSI estimation in the presence of one or more strong interfering signals. In other words, a training sequence portion of signals $r_N, r_D$ shown in FIG. 1 is used.

According to the invention, with same receiver structure, it is possible to estimate the RSSI for both normal and diversity branches using only a training sequence of a received burst. Estimated impulse response contains mostly the desired signal, and in some cases residual interfering signal due to training sequence correlation. As a result the impulse response signal power will represent accurately the true RX level, which should be used in the PC and HO commands by the network.

Figure 2:
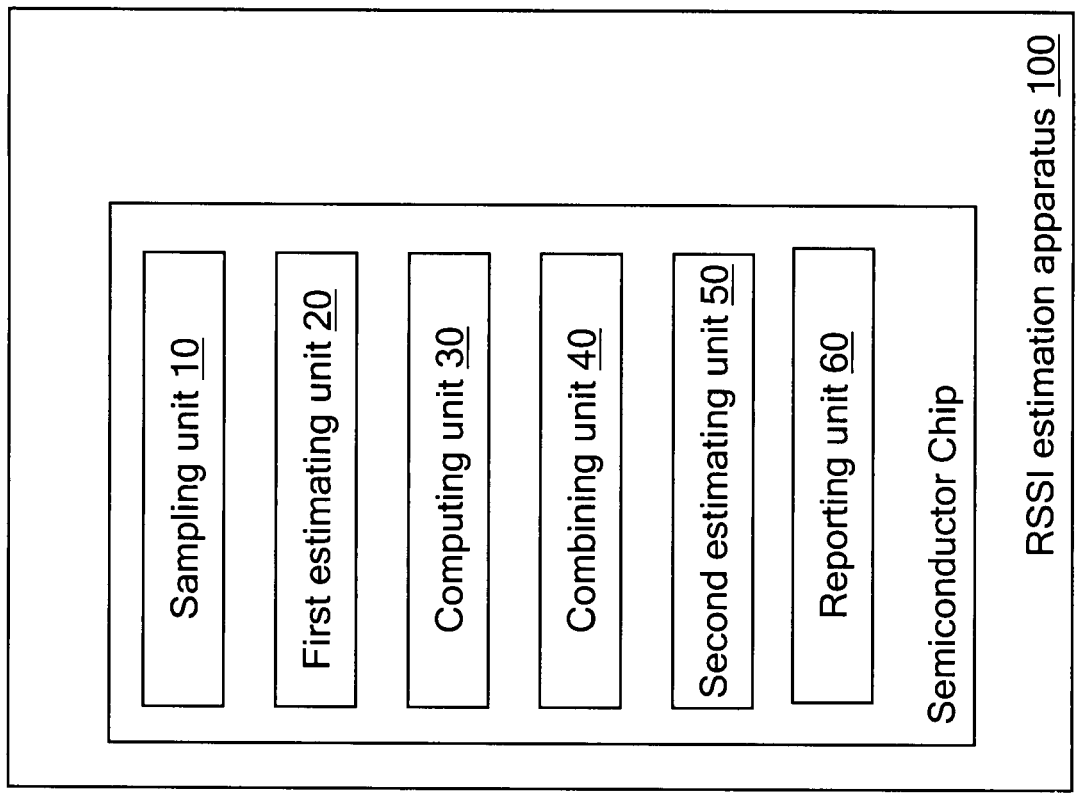
FIG. 2 shows a schematic block diagram illustrating an apparatus for providing RSSI according to an embodiment of the invention.

FIG. 2 shows a schematic block diagram illustrating an apparatus 100 for providing RSSI according to an embodiment of the invention.

The apparatus 100 provides an indicator (RSSI) of a strength of a signal comprising a training sequence portion received in a radio propagation environment. The apparatus 100 comprises a sampling unit 10, a first estimating unit 20, a computing unit 30, a combining unit 40 and a second estimating unit 50. The apparatus may further comprise a reporting unit 60 and a canceling unit (not shown in FIG. 2) for removing interference from a diversity signal.

The sampling unit 10 takes samples from a training sequence portion of a diversity signal received via a plurality of channels in a radio propagation environment, for each of the plurality of channels. The first estimating unit 20 estimates, for each of the plurality of channels, a channel impulse response. The computing unit 30 computes, for each of the plurality of channels, an energy value of the samples across the channel impulse response, thereby obtaining energy values for each of the plurality of channels. The combining unit 40 combines the energy values, thereby obtaining a combined energy value, and the second estimating unit 50 estimates an indicator of a strength of the diversity signal from the combined energy value. The reporting unit 60 may report the indicator to a network. Moreover, the reporting unit 60 may report the indicator to the network after interference is removed from the received diversity signal.

According to an embodiment of the invention, the sampling unit 10, the first estimating unit 20, the computing unit 30, the combining unit 40 and the second estimating unit 50 may be integrated as circuitries on a semiconductor chip as indicated in FIG. 2. Moreover, the semiconductor chip may comprise the reporting unit 60 and the canceling unit (not shown in FIG. 2).

It is to be noted that the arrangement of the functional blocks of the RSSI estimation apparatus 100 or the semiconductor chip is not construed to limit the invention, and the functions may be performed by one block or further split into sub-blocks.

The computing unit 30 may compute the energy value by:

$$\sigma_r^2 = \frac{1}{K-L+1} \sum_{k=0}^{k=K-L} |y(p+L-1+k)|^2$$

where K represents a number of training symbols in the training sequence portion, L represents a length of channel impulse response, and p denotes a pointer pointing to the first training symbol in the training sequence portion of the signal.

At least one of the sampling unit, the first estimating unit and the computing unit may be provided for each of the plurality of channels, or may be provided as single unit for all of the plurality of channels.

The RSSI estimation apparatus 100 may be part of a diversity receiver which may be part of a user equipment which may be used in a mobile communication network system, such as a mobile terminal.

The RSSI estimation apparatus 100 may also be part of a network element used in the mobile communication network system, such as a BTS.

Figure 3:
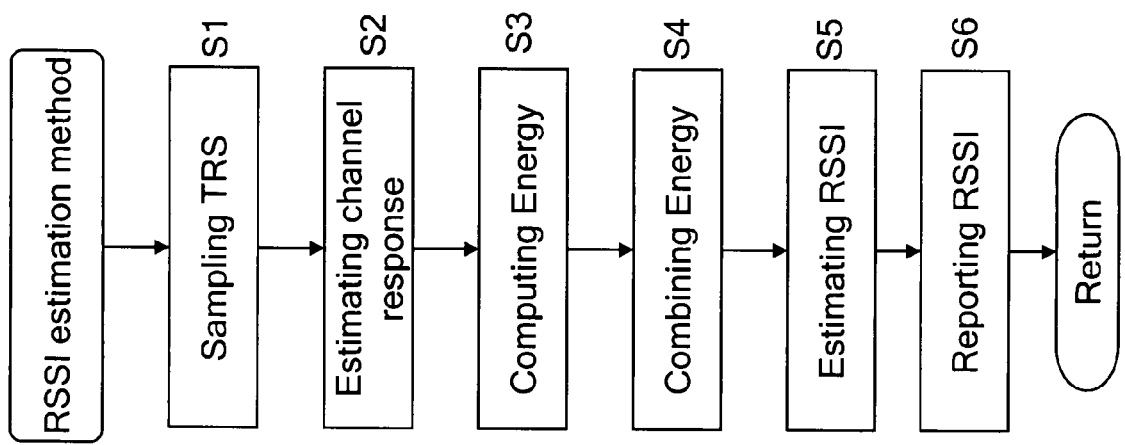
FIG. 3 shows a flow chart illustrating processing steps of a method of providing RSSI according to the embodiment of the invention.

FIG. 3 shows a flow chart illustrating processing steps of a method of providing RSSI according to the embodiment of the invention.

In a first step S1 in FIG. 3, samples are taken from a training sequence portion of a diversity signal received via a plurality of channels in a radio propagation environment, for each of the plurality of channels. In step S2, for each of the plurality of channels, a channel impulse response is estimated. In step S3, for each of the plurality of channels, an energy value of the samples across the channel impulse response is computed, thereby obtaining energy values for each of the plurality of channels. In step S4, the energy values are combined, thereby obtaining a combined energy value. In step S5, an indicator of a strength of the diversity signal is estimated from the combined energy value. Furthermore, in step S6 the indicator may be reported towards a network. The indicator may be reported to the network after interference is removed from the received diversity signal.

In step S3 the energy may be computed by:

$$\sigma_r^2 = \frac{1}{K-L+1} \sum_{k=0}^{k=K-L} |y(p+L-1+k)|^2$$

where K represents a number of training symbols in the training sequence portion, L represents a length of channel impulse response, and p denotes a pointer pointing to the first training symbol in the training sequence portion of the signal.

The above method of estimating the RSSI may be implemented as computer program product including a program for a processing device of e.g. a user equipment or a network element.

The computer program product may be stored on a computer-readable medium, and/or may be directly loadable into an internal memory of the processing device.

In the following an implementation example of the invention will be described.

When EDGE UltraSite platform is used as a reference, normal and access bursts comprise received symbols with the order shown in FIG. 4.

The normal burst NB comprises 4 guard symbols, followed by 3 tails symbols, followed by 58 data symbols, followed by 26 training sequence (TRS) symbols, followed by 58 data symbols, followed by 3 tails symbols and finally 4 guard symbols.

The access burst AB comprises 8 tails symbols, followed by 41 TRS symbols, followed by 36 data symbols, followed by 3 tails symbols and finally 38 guard symbols.

Figure 5:
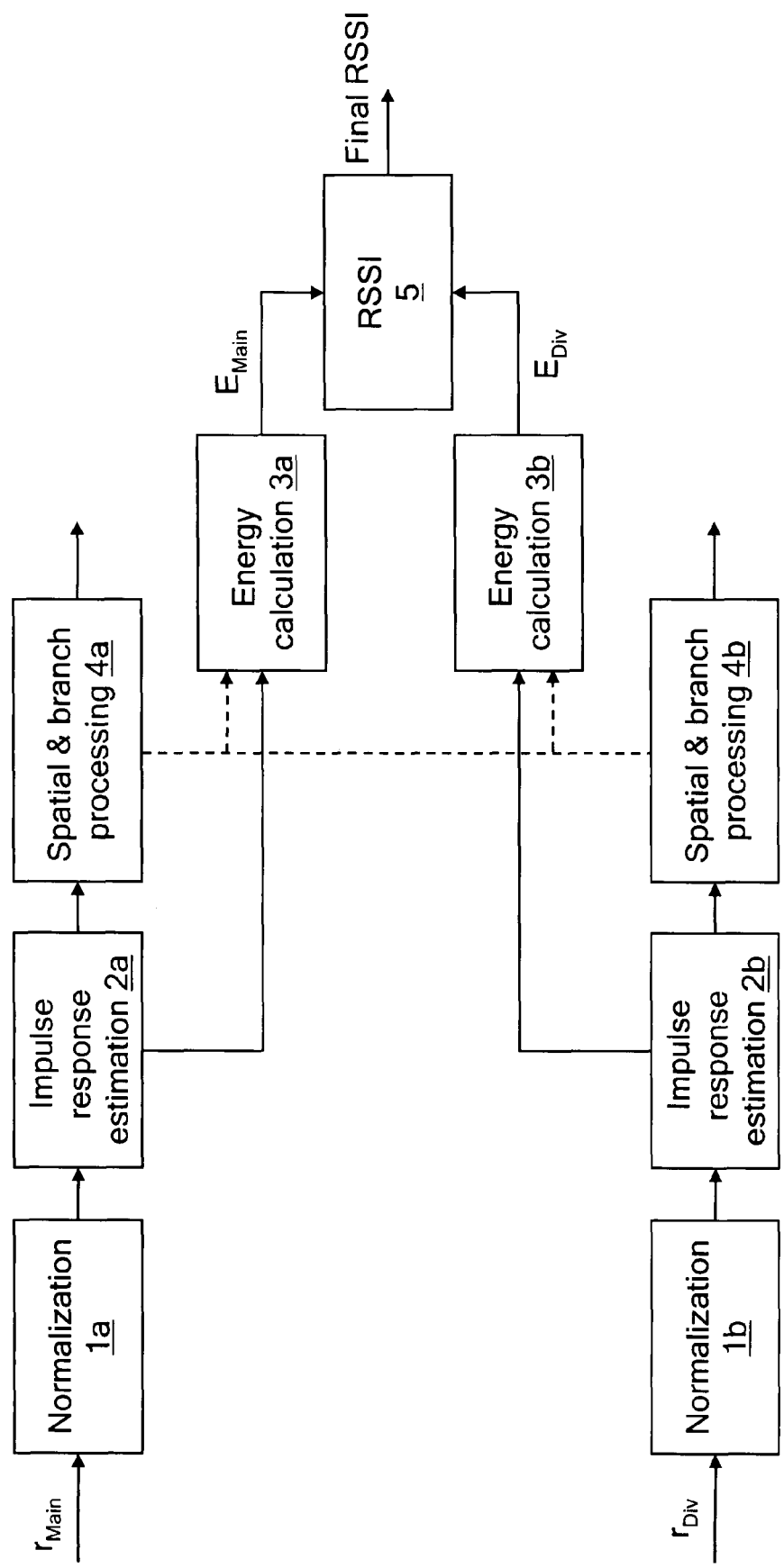
FIG. 5 shows a schematic block diagram illustrating an RSSI energy calculation according to the invention.

FIG. 5 shows a schematic block diagram illustrating an RSSI energy calculation according to the invention.

As shown in FIG. 5, in blocks 1a, 1b received floating point samples $r_{Main}$ and $r_{Div}$ are normalized to obtain normalized fixed point samples. The signal flow $r_{Main}$ refers to a main or normal signal channel or branch, and the signal flow $r_{Div}$ refers to a diversity signal channel or branch. FIG. 5 shows only one diversity signal branch, however there may be more than one diversity signal branch and normalization and the following calculation are done for each received signal branch.

According to the invention, samples are taken only from the training sequence of the received signals.

Then, in blocks 2a, 2b channel impulse response is estimated resulting in a number of complex valued impulse response taps.

In blocks 3a, 3b, the energy of complex valued samples across the estimated impulse response is calculated. This energy of the received samples used for RSSI estimation is computed from:

$$\sigma_r^2 = \frac{1}{K-L+1} \sum_{k=0}^{k=K-L} |y(p+L-1+k)|^2 \quad (8)$$

where K represents the length of training symbols (for AB K=41 and for NB K=26), L represents the length of channel impulse response (where L=6 for 8PSK (Phase Shift Keying) and 5 for GMSK (Gaussian Minimum Shift Keying)) and p denotes the pointer indicating the first received training symbol (i.e. according to the present implementation example p=65 for NB p=8 for AB).

The calculation of the energy across the impulse response is performed in order to avoid taking samples from a part of a burst different from the training sequence. In case other parts of the received signal were used, the estimate would be corrupted by the interference.

Blocks 4a, 4b represent a spatial and branch processing stage in which interference cancellation and branch-wise noise whitening in temporal domain over the sampled signal is performed. In other words, interference is removed in either of two stages (spatial and temporal), or jointly (spatio-temporal). Spatial processing is done jointly over the branches and temporal processing is done jointly over the number of samples per each symbol. Spatio-temporal processing does these two functions in a single operation. Spatially interference is rejected from the composite signal, and temporally from each individual branch.

Finally, in block 5 the calculated energies $E_{Main}$ and $E_{Div}$ of the main signal branch and the diversity signal branch are combined and RSSI is calculated from the combined energy.

Calculation is done for all received signal branches, and finally the combined power or RSSI of all signal branches is reported to network as RX_LEV.

Combined signal power from all signal branches is reflected in the receiver error probability, and therefore describes the receiver performance with any number of receiver antennas. As a result the PC commands and need for HO are carried out according to the true need, which is not disturbed by interference anymore.

BSC (Base Station Controller) creates a handover and power control (HOPC) process for each connection to be established. Corresponding measurements are updated according to the multi-frame structure.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
   taking samples, using a sampling unit, from a training sequence portion of a diversity signal received via a plurality of channels in a radio propagation environment, for each of the plurality of channels;
   for each of the plurality of channels, estimating a channel impulse response;
   for each of the plurality of channels, computing, using a computing unit, an energy value of the samples across the channel impulse response, thereby obtaining energy values for each of the plurality of channels;
   combining the energy values, thereby obtaining a combined energy value; and
   estimating, using an estimating unit, an indicator of a strength of the diversity signal from the combined energy value.

2. The method of claim 1, further comprising
   reporting the indicator towards a network.

3. The method of claim 2, further comprising
   removing interference from the diversity signal, upon estimating the channel impulse response.

4. The method of claim 1, further comprising
   removing interference from the diversity signal.

5. The method of claim 1, wherein the energy value is computed by:

$$\sigma_r^2 = \frac{1}{K-L+1} \sum_{k=0}^{k=K-L} |y(p+L-1+k)|^2$$

where K represents a number of training symbols in the training sequence portion, L represents a length of the channel impulse response, and p denotes a pointer pointing to the first training symbol in the training sequence portion of the signal.

6. A computer readable storage medium comprising a computer program product, the computer program product comprising program code for controlling a processor to execute a method comprising:
   taking samples from a training sequence portion of a diversity signal received via a plurality of channels in a radio propagation environment, for each of the plurality of channels;
   for each of the plurality of channels, estimating a channel impulse response;
   for each of the plurality of channels, computing an energy value of the samples across the channel impulse response, thereby obtaining energy values for each of the plurality of channels;
   combining the energy values, thereby obtaining a combined energy value; and
   estimating an indicator of a strength of the diversity signal from the combined energy value.

7. The computer readable storage medium according to claim 6, wherein the program code is directly loadable into an internal memory of the processing device.

8. An apparatus comprising:
   a sampling unit configured to take samples from a training sequence portion of a diversity signal received via a plurality of channels in a radio propagation environment, for each of the plurality of channels;
   a first estimating unit configured to estimate, for each of the plurality of channels, a channel impulse response;
   a computing unit configured to compute, for each of the plurality of channels, an energy value of the samples across the channel impulse response, thereby obtaining energy values for each of the plurality of channels;

a combining unit configured to combine the energy values, thereby obtaining a combined energy value; and
- a second estimating unit configured to estimate an indicator of a strength of the diversity signal from the combined energy value.

9. The apparatus of claim 8, further comprising:
a reporting unit configured to report the indicator to a network.

10. The apparatus of claim 9, further comprising:
a canceling unit configured to remove interference from the diversity signal, upon estimating the channel impulse response.

11. The apparatus of claim 8, comprising a canceling unit configured to remove interference from the diversity signal.

12. The apparatus of claim 8, wherein the computing unit is configured to compute the energy value by:

$$\sigma_r^2 = \frac{1}{K-L+1} \sum_{k=0}^{k=K-L} |y(p+L-1+k)|^2$$

where K represents a number of training symbols in the training sequence portion, L represents a length of the channel impulse response, and p denotes a pointer pointing to the first training symbol in the training sequence portion of the signal.

13. The apparatus of claim 8, wherein at least one of the sampling unit, the first estimating unit and the computing unit is provided for each of the plurality of channels.

14. The apparatus of claim 8, wherein at least one of the sampling unit, the first estimating unit and the computing unit is provided as single unit for all of the plurality of channels.

15. A diversity receiver comprising:
an apparatus comprising
- a sampling unit configured to take samples from a training sequence portion of a diversity signal received via a plurality of channels in a radio propagation environment, for each of the plurality of channels,
- a first estimating unit configured to estimate, for each of the plurality of channels, a channel impulse response,
- a computing unit configured to compute, for each of the plurality of channels, an energy value of the samples across the channel impulse response, thereby obtaining energy values for each of the plurality of channels,
- a combining unit configured to combine the energy values, thereby obtaining a combined energy value, and
- a second estimating unit configured to estimate an indicator of a strength of the diversity signal from the combined energy value.

16. The diversity receiver of claim 15, wherein the diversity receiver is part of a user equipment.

17. The diversity receiver of claim 16, wherein the diversity receiver is part of a base transceiver station.

18. A communication network system, comprising:
a user equipment; and
a base transceiver station,
wherein each of the user equipment and base transceiver station comprises an apparatus comprising
- a sampling unit configured to take samples from a training sequence portion of a diversity signal received via a plurality of channels in a radio propagation environment, for each of the plurality of channels,
- a first estimating unit configured to estimate, for each of the plurality of channels, a channel impulse response,
- a computing unit configured to compute, for each of the plurality of channels, an energy value of the samples across the channel impulse response, thereby obtaining energy values for each of the plurality of channels,
- a combining unit configured to combine the energy values, thereby obtaining a combined energy value, and
- a second estimating unit configured to estimate an indicator of a strength of the diversity signal from the combined energy value.

19. A semiconductor chip comprising:
a sampling unit configured to take samples from a training sequence portion of a diversity signal received via a plurality of channels in a radio propagation environment, for each of the plurality of channels;
a first estimating unit configured to estimate, for each of the plurality of channels, a channel impulse response;
a computing unit configured to compute, for each of the plurality of channels, an energy value of the samples across the channel impulse response, thereby obtaining energy values for each of the plurality of channels;
a combining unit configured to combine the energy values, thereby obtaining a combined energy value; and
a second estimating unit configured to estimate an indicator of a strength of the diversity signal from the combined energy value.

20. The semiconductor chip of claim 19, further comprising:
a reporting unit configured to report the indicator to a network.

21. The semiconductor chip of claim 20, further comprising:
a canceling unit configured to remove interference from the diversity signal, upon estimating the channel impulse response.

* * * * *